United States Patent [19]

Solhjell

[11] Patent Number: 5,696,537
[45] Date of Patent: Dec. 9, 1997

[54] MOUSE FOR DATA ENTRY AND CONTROL WITH CONTROL OF BALL FRICTION FORCE

[75] Inventor: Erik Solhjell, Oslo, Norway

[73] Assignee: Tandberg Data Storage AS, Oslo, Norway

[21] Appl. No.: 717,935

[22] Filed: Jun. 20, 1991

[51] Int. Cl.[6] .................................................. G09G 5/08
[52] U.S. Cl. ................................. 345/164; 345/167
[58] Field of Search .......................... 340/706, 709, 340/710, 707; 74/471 XY; 345/156, 157, 163, 164, 165, 166, 167; 188/161, 162, 163, 164

[56] References Cited

U.S. PATENT DOCUMENTS

| | | | |
|---|---|---|---|
| 3,376,551 | 4/1968 | Armbruster | 340/710 |
| 3,407,319 | 10/1968 | Arraiza | 188/161 |
| 3,416,749 | 12/1968 | O'Neill | 188/161 |
| 3,625,083 | 12/1971 | Bose | 340/710 |
| 3,987,685 | 10/1976 | Opocensky | 340/710 |
| 4,110,670 | 8/1978 | Araki et al. | 188/164 |
| 4,546,298 | 10/1985 | Wickham et al. | 188/162 |
| 4,562,347 | 12/1985 | Hovey | 340/710 |
| 4,656,458 | 4/1987 | Iwata | 340/429 |
| 4,868,549 | 9/1989 | Affinito | 340/709 |
| 4,906,843 | 3/1990 | Jones | 340/710 |
| 4,952,081 | 8/1990 | Hedtke | 340/710 |
| 5,027,115 | 6/1991 | Sato et al. | 340/707 |
| 5,078,019 | 1/1992 | Aoki | 340/710 |

FOREIGN PATENT DOCUMENTS

| | | | |
|---|---|---|---|
| 1211408 | 2/1966 | Germany | 340/710 |
| 0111524 | 6/1984 | Japan | 340/710 |
| 62-75830 | 4/1987 | Japan . | |
| 63-92947 | 6/1988 | Japan . | |
| 63-318624 | 12/1988 | Japan . | |
| 1-129319 | 5/1989 | Japan . | |
| 1-267721 | 10/1989 | Japan . | |

*Primary Examiner*—Steven Saras
*Attorney, Agent, or Firm*—Hill, Steadman & Simpson

[57] ABSTRACT

A mouse system is disclosed for data entry and control and wherein a rolling force of the ball is made adjustable to suit an operator's preference. A friction pad or a magnetic force may be applied to the ball to change and adjust the ball rolling force. Alternatively, a free roller in contact with the ball has its rotational force adjustable by friction or magnetic forces acting on the free roller or its axle. The mouse system disclosed is designed ergonomically to ease operator fatigue and increase an operator's efficiency.

17 Claims, 2 Drawing Sheets

MOUSE FOR DATA ENTRY AND CONTROL WITH CONTROL OF BALL FRICTION FORCE

BACKGROUND OF THE INVENTION

The present invention relates to a mouse used for data entry into a computer system.

A keyboard is normally used to enter data manually into a computer system. These keyboards can be made in many different versions. However, they are all designed around the same basic concept: the keyboard contains groups of "Keys", each assigned to a specific letter or number of one or more signs. Additionally, most modern keyboards for data systems also contain a series of function keys. Each function key may activate a special operation, depending upon the program being executed in the computer.

To simplify operations, many data systems and computer programs are also designed to work with a "mouse" in addition to the keyboard. Although these mice may take many forms, their basic functions are the same: a unit containing a ball and one or more keys which may be pressed down. Two types of mouse systems exist, as described hereafter.

In the first type, the ball is mounted on the bottom side of the mouse housing. Moving the mouse by rolling the mouse housing along a table will make the ball roll. This rolling ball operation is transferred to a corresponding movement of the cursor on the data screen of the connected computer. The ball operation can be translated into a distance and direction moved along an x-axis and a distance and direction moved along a y-axis. This movement is then transferred to the computer which moves the cursor on the screen in directions and distance corresponding to those given by the mouse movement. In most programs the relationship between a given rolling distance of the mouse ball and the corresponding movement of the cursor can be programmed, and also the acceleration of the mouse operation can be programmed.

The second type of mouse design differs since the ball is on the top of the mouse housing. Again the mouse housing can be moved, but the basic operation is performed by having the mouse rest fairly permanently. The ball is moved by rolling it with the hand. This again will correspond to a movement of the cursor as described above.

Previously, this second type of mouse was often referred to as a "trackball." Today, the name "mouse is normally used also about this type, and will be used in the rest of this application.

Both mouse designs therefore operate the cursor in the same way, the difference between the designs are related to the movement of the ball. Both versions typically have one or more keys 6, 7 as shown in FIG. 2, or 8, 9 as shown in FIG. 4, which the operator may activate in addition to the operation of the ball. Depending upon the computer program, the operation of the ball together with the pressing of one or more keys will create specified operations or reactions by the computer program.

Although mouse operations may increase an operator's efficiency, the mouse also poses some problems. Mice designed to be moved along a table (roller ball on bottom), may require a fairly substantial table area. In some computer areas, this may cause problems. Additionally, the surface of the table area may not be well suited with the force required to move the mouse ball. If the friction is too low, it may be too easy to move the mouse and the ball. If the friction is too hard, it may be difficult to run the mouse correctly. The ball may just slide along the table without moving correctly. To a certain extent, this may be helped by using a table with a special friction surface, or by running the mouse on a specially designed friction pad. Still, the ball force may not be optimized for the particular operator and his or her surroundings.

The other mouse type with the roller ball on the top does not require a large additional table area for its operation. However, because the operator's hand shall control both the rolling of the ball and the keys directly, the design of the ball and the force required to move the ball is very critical. Again, each operator may prefer a special ball friction.

FIGS. 1 and 2 show at 10 a typical mouse design with a ball 11 on the under side of a mouse housing 12. For simplicity, this is referred to as "Type 1" in the following text. FIGS. 3 and 4 show a mouse 13 with a ball 14 on the top side of a housing 15. This will be referred to as "Type 2" in the following text.

When a mouse of type 1 is moved along the table, the ball 11 is rolling and this ball movement is transferred to an "x-" and a "y-" control system internally in the mouse housing 12. Although this control system may vary in design, the basic principle is to register the movement of the ball along an x- or respective y-axis. Typically, the ball is touching three or four rollers, where one or two such as 18 in FIG. 5 are freerolling and the other two such as 16, 17 in FIG. 5 are connected to systems for detecting the direction of the revolution of the roller and the length of rolling. One of these detection rollers is referred to as the x-axis controller 16 and the other one (90 degrees off the x-axis roller) is referred to as the y-axis controller 17 (see FIG. 5). These two rollers 16, 17 work independently. The direction and movement of the x- and y-controllers are transferred to the cursor on the data screen on the connected data system. Most programs permit the ratio between the movement of the ball in the x- and the y-directions and the corresponding movement of the cursor in the same directions to be set to suit the specific taste and requirements of the operator.

The type 2 mouse as shown at 13 in FIGS. 3 and 4 operates in the same way, except that the ball 14 is on the top of the housing 15 and is moved directly by the operator's hand.

The extra keys such as 6, 7 or 8, 9 which may be pressed down by the operator are used to mark special cursor locations, start and stop of a cursor movement, etc. This will vary, depending upon the program being run. Typically, a mouse may have two or three keys in addition to the ball. More than three keys are normally not practical.

SUMMARY OF THE INVENTION

Although a mouse in many applications is an effective tool, it is important that the mouse system be designed ergonomically to ease operator fatigue and increase the operator's efficiency. The force required to move the ball is very critical here. The problem is that it is very difficult to set up exact requirements for this ball force, as what is best for one operator may be very bad for another operator.

Mice on the market today have been designed with a fixed force required to move the ball. An operator may therefore have to try out many different designs before finding one which the operator feels is suitable.

It is an object of this invention to make it easier to adapt the mouse to the particular need of an operator by making it possible to adjust the rolling force of the ball (both for type 1 and type 2 mice). Each operator may individually control the rolling force of the ball between wide minimum and maximum values.

According to the mouse design of the invention, the rolling force of the ball is adjustable. An adjustable pressure pad may be employed to control friction force to which the ball is subjected. A friction force can also be applied to one of the internal rollers in contact with the ball.

DESCRIPTION OF THE PREFERRED EMBODIMENTS

Figure 1:
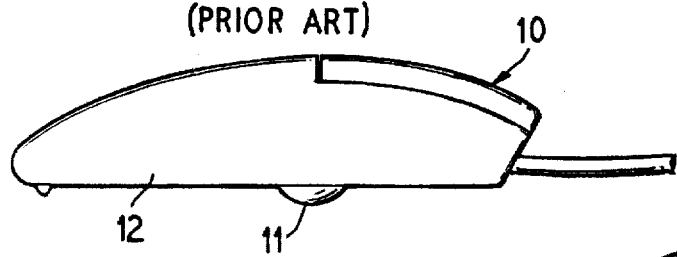
FIG. 1 is a side view of a prior art mouse system of a so-called "type 1" wherein the ball is on the bottom of a housing of the mouse system.
Figure 2:
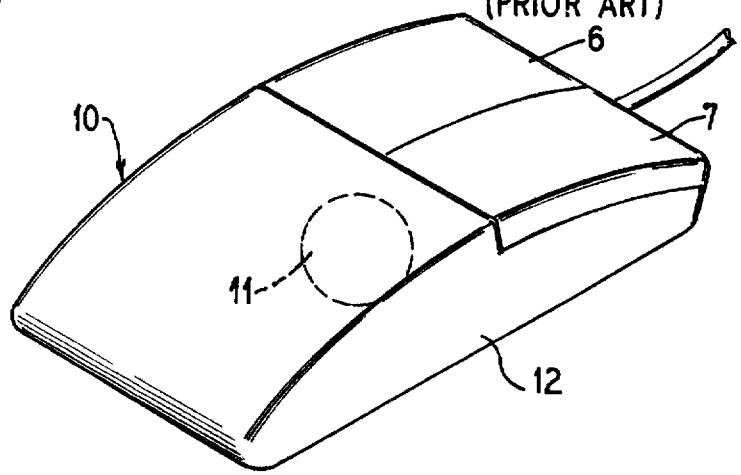
FIG. 2 is a perspective view of the mouse system shown in FIG. 1.
Figure 3:
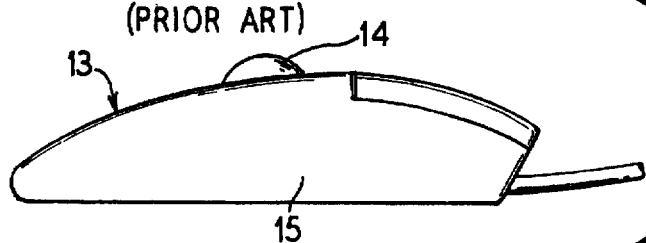
FIG. 3 is a side view of a so-called "type 2" prior art mouse system where the roller ball is on a top of the housing of the mouse system.
Figure 4:
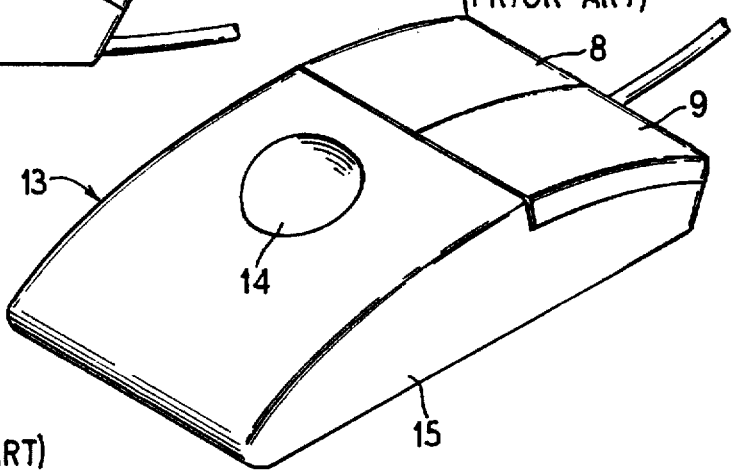
FIG. 4 is a perspective view of the type 2 mouse system shown in FIG. 3.
Figure 5:
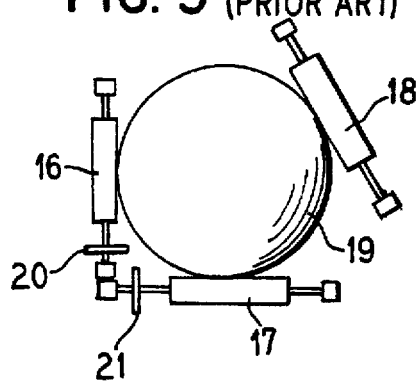
FIG. 5 is a side schematic illustration of internal rollers in contact with a ball of a mouse system according to the prior art.
Figure 6:
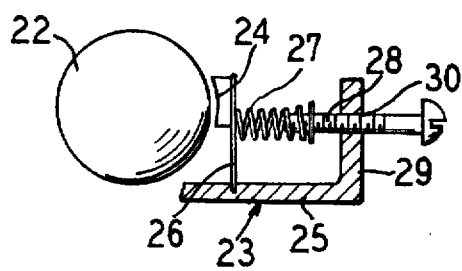
FIG. 6 is a side view of a ball in a mouse system wherein an adjustable friction force is applied to the ball according to the invention.

A mouse system having an adjustable friction force applied to a ball of a mouse is generally shown by the mechanism 23 illustrated in FIG. 6. As shown there, in the simplest form, the friction control is achieved by a friction pad 24 on a flexible arm 26 attached to a base 25. A spring 27 exerts adjustable force against the spring-like arm 26 so as to force the friction pad 24 against the ball 22. By adjusting adjustment screw 28 received in aperture 30 of a support arm 29, the force exerted by the pressure spring can be adjusted, and consequently the friction force is adjusted.

Figure 7:
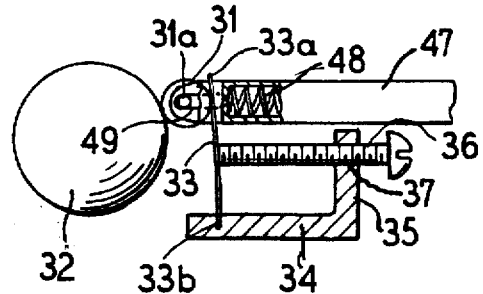
FIG. 7 is an alternate embodiment wherein a friction force is applied to a free roller in contact with a ball of the mouse system according to the invention.

FIG. 7 shows another principle. One or more of the free rollers such as 31 which the ball 32 is resting upon (typically one or two, in addition to those two which are used for x- and y-measurements), have a controlled friction force or rolling force. In FIG. 7, this is achieved by a leaf spring 33 touching the roller 31 itself or the axle or a member mounted on the axle. The spring force is again adjustable by a simple screw 36 retained in a threaded aperture 37 on a support arm 35 connected to a base 34 which also supports the leaf spring 33. The end of the screw exerts a force intermediate between the ends 33a and 33b of the leaf spring 33. Alternatively, the leaf spring 33 can be biased by a wheel or arm control system.

Typically, the two rollers used for x- and y-movement should have identical or as close to an identical rolling force as possible. Although it is possible to use these two rollers for friction control, it is normally better to use the independent free roller for roller 31.

Several different means may be used to control the spring force, and other types of springs may also be used.

Figure 8:
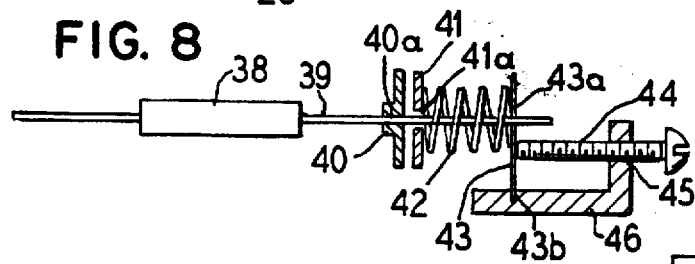
FIG. 8 is a further embodiment of FIG. 7 wherein a friction force is applied to a free roller via a disc attached to an axis of the free roller.

FIG. 8 shows another principle where the friction of one of the rollers 38 is controlled by a system of two friction disks 40 and 41. One disk 40 is mounted by collar 40a permanently on the axle 39 of the roller 38. The other disk 41 is fixed to a spring, the force of the spring pressing the two disks together. The axle 39 passes through an aperture 41a of the movable disk 41. Thus, the spring force may be adjusted, thereby adjusting the rolling force of the ball. Again, in principle any of the rollers may be used, however, for most systems the freeroller (or one of them if more than one is employed) is used most advantageously.

The systems shown in FIGS. 7 and 8 are not the only ones which can be used to control the friction of the roller. Other systems which allow for the control of the friction of the roller may be provided.

For the designs shown in FIGS. 7 and 8, it can be advantageous to mount the friction control roller "floating" so that it is slightly pressed away when the ball is pressed. This ensures a good contact between the friction roller 31 or 38 and the ball 32. For example, in FIG. 7, a support arm 47 having a spring 48 biasing an axle 31a of the roller 31 can be provided. The axle would then be shiftable in a longitudinal direction of the arm 47 in a guide slot 49. Two of such support arms 47 could be provided at each end of the roller 31.

Figure 9:
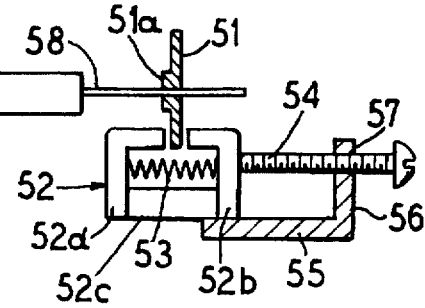
FIG. 9 is an alternate embodiment of FIG. 8 wherein a magnetic force is applied to the disc attached to the free roller for changing a rotational force.

FIG. 9 shows a principle where the force of one of the rollers 50 is controlled by a magnetic system 52. A circular ring or disk 51 is mounted by a mounting collar 51a on one of the roller axles 58. The ring 51 may be made of iron or other magnetic sensitive materials. A magnet 52a, 52b is placed on each side of the ring as shown. Making the distance between the magnet segments 52a, 52b and the iron ring smaller or larger increases or decreases the force required to move the mouse ball and associated free roller 50. The disk 51 may also be a magnet by itself. In this case, the friction force will vary as the magnet turns. This may be a desirable effect in some systems.

As shown in FIG. 9, the spacing between the magnet segments 52a, 52b is accomplished by providing a spring 53 between the segments and providing a guide channel mechanism 52c so that the two magnet segments are slidable with respect to one another.

Figure 10:
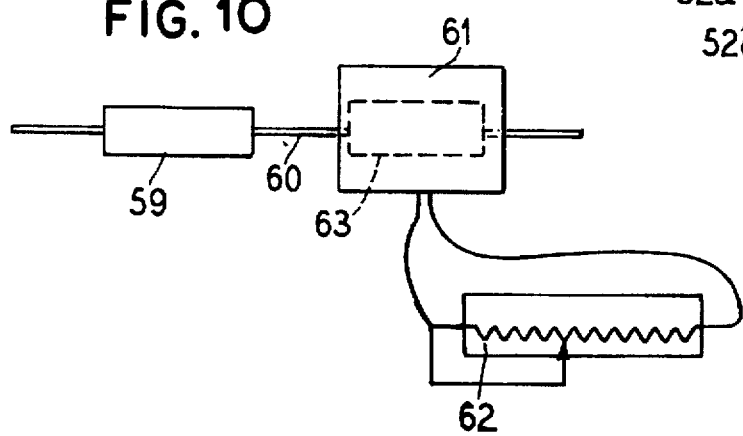
FIG. 10 is a further embodiment wherein a generator applies a force to an axis of the free roller for adjusting a rotational force thereof.

This principle of using magnets may also be used in many other ways. One system as shown in FIG. 10 is to let the roller axle 60 of roller 59 also be the axle passing through a small generator 61 or a motor acting as a generator. The generator magnet 63 is mounted on the axle 60 and rotates with the roller. The magnet induces a current in the motor windings. The leads from the motor windings are connected to an adjustable resistor 62. Adjusting the value of the resistor 62 will increase or decrease the force required to keep the roller axle 60 rolling.

Figure 11:
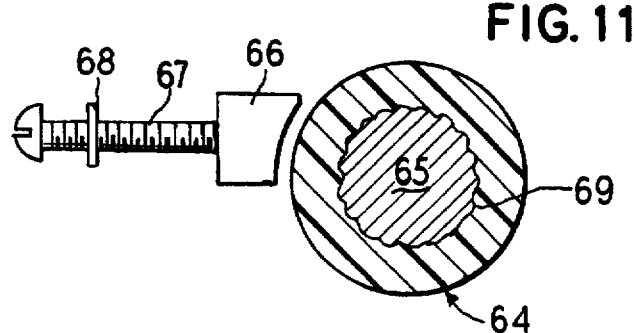
FIG. 11 is an alternate embodiment of the invention shown in FIG. 6 wherein a magnet is employed to change the rotational force necessary to rotate the ball in the mouse system of the invention.

FIG. 11 shows another embodiment for controlling the force required to move the ball 64. The basic principle is shown in the Figure. The mouse ball 64 contains internally a core 65 (another ball) made of iron or similar magnetic sensitive material. A magnet 66 is placed in the mouse housing outside the ball 64. The magnet will attract the iron core 65 of the ball 64. The distance between the magnet 66 and the ball 64 is adjustable with a screw 67 mounted on a support 68 or similar means. A force is required to rotate the ball, the force increasing as the magnet is moved closer to the ball.

The internal core 65 of the ball is a circular ball, or can have many small bumps 69 shown in dashed lines, or craters, each bump or crater being very close to its neighboring craters. This will have the effect of creating a varying ball force. It will be lowest when a crater is nearest to the magnet. This will give the operator the feeling of a ball moving in small "steps." For some systems, this may give the operator a better feeling of the ball control.

The control magnet can also be an electromagnet where the force is controlled by changing the current through the coil. This will therefore avoid the need for a physical change of the magnet position relative to the ball, the adjustment instead being done by changing the magnetic force electrically.

In FIGS. 6 through 11, a screw has been used to adjust the force. Other implementations can also be used, including a wheel or a movable arm.

Although various minor changes and modifications might be proposed by those skilled in the art, it will be understood that I wish to include within the claims of the patent warranted hereon all such changes and modifications as reasonably come within my contribution to the art.

I claim as my invention:

1. A mouse system, comprising:

a mouse ball;

means for retaining and sensing rotation of the mouse ball;

operator accessible adjusting means for permitting each individual operator of the mouse system to select a rolling force of the mouse ball which is specifically desired by the particular operator to satisfy his or her preference for a specific feel and to thus satisfy a requirement of the operator during use; and said adjusting means comprising said ball having a magnetic force responsive core and wherein a magnet means is provided in close proximity to a periphery of the ball for exerting a magnetic force on the core, and wherein a magnet adjustment means is provided for changing a spacing of the magnet means from the periphery of the ball.

2. A mouse system, comprising:

mouse ball;

means for retaining and sensing rotation of the mouse ball;

operator accessible adjusting means for permitting each individual operator of the mouse system to select a rolling force of the mouse ball which is specifically desired by the particular operator to satisfy his or her preference for a specific feel and to thus satisfy a requirement of the operator during use;

at least one roller in contact with an outer periphery of the ball and wherein said adjusting means comprises means for selectively changing a rotating force of the roller; and said means for selectively changing a rotating force of the roller comprising a leaf spring having one end applying a frictional force to a member which rotates with the roller, and wherein means is provided for adjusting the frictional force.

3. A mouse system, comprising a mouse ball;

means for retaining and sensing rotation of the mouse ball;

operator accessible adjusting means for permitting each individual operator of the mouse system to select a rolling force of the mouse ball which is specifically desired by the particular operator to satisfy his or her preference for a specific feel and to thus satisfy a requirement of the operator during use;

at least one roller in contact with an outer periphery of the ball and wherein said adjusting means comprises means for selectively changing a rotating force of the roller; and the roller having an axle, a disk fixed to the axle, a movable disk provided for abutting contact with the fixed disk on the axle, the axle passing through an aperture of the movable disk, and means for applying an adjustable spring force to the movable disk for varying a friction contact between the fixed disk and the movable disk so as to effect an adjustment of said rotating force of the roller.

4. A system according to claim 3 wherein said means for applying an adjustable spring force comprises a spring encircling the axle and having one end biased against the movable disk, and another end attached to a support whose position is adjusted by an adjustment means.

5. A mouse system, comprising:

a mouse ball;

means for retaining and sensing rotation of the mouse ball;

operator accessible adjusting means for permitting each individual operator of the mouse system to select a rolling force of the mouse ball which is specifically desired by the particular operator to satisfy his or her preference for a specific feel and to thus satisfy a requirement of the operator during use;

at lest one roller in contact with an outer periphery of the ball and wherein said adjusting means comprises means for selectively changing a rotating force of the roller; and said free roller having an axle, a disk fixed to the axle, said disk comprising a material which reacts to magnetic force, and magnet means adjacent to the disk for applying a varying magnetic force to the disk.

6. A system according to claim 5 wherein said magnet means comprises first and second magnet parts on opposed sides of the disk at a periphery of the disk, and wherein means is provided for changing a spacing of at least one of the magnet parts relative to the disk.

7. A mouse system, comprising:

a mouse ball;

means for retaining and sensing rotation of the mouse ball;

operator accessible adjusting means for permitting each individual operator of the mouse system to select a rolling force of the mouse ball which is specifically desired by the particular operator to satisfy his or her preference for a specific feel and to thus satisfy a requirement of the operator during use;

at least one roller in contact with an outer periphery of the ball and wherein said adjusting means comprises means for selectively changing a rotating force of the roller; and said roller having an axle, a rotor of a generator connecting to the axle, and means for applying a variable electric field to the rotor of the generator for varying said rotating force of said roller.

8. A system according to claim 7 wherein a field of said generator is connected to a variable resistor.

9. A mouse system, comprising:

a mouse ball;

means for retaining and sensing rotation of the mouse ball;

operator accessible adjusting means for permitting each individual operator of the mouse system to select a rolling force of the mouse ball which is specifically desired by the particular operator to satisfy his or her preference for a specific feel and to thus satisfy a requirement of the operator during use;

at least one roller in contact with an outer periphery of the ball and wherein said adjusting means comprises means for selectively changing a rotating force of the roller; and said roller having an axle, a rotor of a motor connecting to the axle, and means for applying a variable electric field to the rotor of the motor for varying said rotating force of said roller.

10. A system according to claim 9 wherein a field of said motor is connected to a variable resistor.

11. A mouse system, comprising:

a mouse ball;

means for retaining and sensing rotation of the mouse ball;

operator accessible adjusting means for permitting each individual operator of the mouse system to select a rolling force of the mouse ball which is specifically desired by the particular operator to satisfy his or her preference for a specific feel and to thus satisfy a requirement of the operator during use;

said adjusting means comprising magnetic means for controlling said rolling force; and said magnetic means comprising means for permitting the mouse ball to rotate a generator means for producing current which is connected to a variable resistor.

12. A mouse system, comprising:

a mouse ball;

means for retaining and sensing rotation of the mouse ball;

operator accessible adjusting means for permitting each individual operator of the mouse system to select a rolling force of the mouse ball which is specifically desired by the particular operator to satisfy his or her preference for a specific feel and to thus satisfy a requirement of the operator during use;

said adjusting means comprising magnetic means for controlling said rolling force; and said magnetic means comprising a core of the ball being formed of a magnetic material having a large number of craters thereon, and wherein adjustable magnet means is provided for exerting a force on the core.

13. A system according to claim 12 wherein the magnetic means comprises an electromagnet means for creating an adjustable force by changing the current through the electromagnet means.

14. A mouse system, comprising:

a mouse ball;

means for retaining and sensing rotation of the mouse ball;

operator accessible adjusting means for permitting each individual operator of the mouse system to select a rolling force of the mouse ball which is specifically desired by the particular operator to satisfy his or her preference for a specific feel and to thus satisfy a requirement of the operator during use; and a core of the mouse ball comprising an inner iron ball integrated in an outer ball, and said adjusting means comprising adjustable magnet means for exerting a force on the iron ball.

15. A system according to claim 14 wherein the iron ball has a large number of closely spaced bumps.

16. A system according to claim 14 wherein the iron ball has a large number of closely spaced craters on its surface.

17. A mouse system, comprising:

a mouse ball;

means for retaining and sensing rotation of the mouse ball;

operator accessible adjusting means for permitting each individual operator of the mouse system to select a rolling force of the mouse ball which is specifically desired by the particular operator to satisfy his or her preference for a specific feel and to thus satisfy a requirement of the operator during use; and said adjusting means comprising an adjustable spring means on a roller axis connecting to a roller in contact with the ball.

\* \* \* \* \*